US010083522B2

(12) United States Patent
Jovanovic et al.

(10) Patent No.: US 10,083,522 B2
(45) Date of Patent: Sep. 25, 2018

(54) IMAGE BASED MEASUREMENT SYSTEM

(71) Applicant: SMART PICTURE TECHNOLOGIES INC., Austin, TX (US)

(72) Inventors: Dejan Jovanovic, Austin, TX (US); Keith Beardmore, Santa Fe, NM (US); Kari Myllykoski, Austin, TX (US); Mark O Freeman, Snohomish, WA (US)

(73) Assignee: SMART PICTURE TECHNOLOGIES, INC., Austin, TX (US)

( * ) Notice: Subject to any disclaimer, the term of this patent is extended or adjusted under 35 U.S.C. 154(b) by 240 days.

(21) Appl. No.: 14/745,325

(22) Filed: Jun. 19, 2015

(65) Prior Publication Data
US 2016/0371855 A1 Dec. 22, 2016

(51) Int. Cl.
*G06T 7/13* (2017.01)
*G06T 7/60* (2017.01)
(Continued)

(52) U.S. Cl.
CPC .................. *G06T 7/60* (2013.01); *G06K 9/42* (2013.01); *G06T 5/006* (2013.01); *G06T 7/13* (2017.01);
(Continued)

(58) Field of Classification Search
None
See application file for complete search history.

(56) References Cited

U.S. PATENT DOCUMENTS 3,711,831 A  1/1973 Kaneko et al.
4,801,207 A  1/1989 Williams
(Continued)

FOREIGN PATENT DOCUMENTS

DE     19536294 A1   4/1997
DE   202012104890 U1  3/2013
(Continued)

OTHER PUBLICATIONS

Cain et al. Drawing Accurate Ground Plans Using Optical Triangulation Data. 2003 IEEE Conference on Computer Vision and Pattern Recognition (11 pgs) (Jun. 18-20, 2003).
(Continued)

*Primary Examiner* — Jay Patel
*Assistant Examiner* — Shadan E Haghani
(74) *Attorney, Agent, or Firm* — Wilson, Sonsini, Goodrich & Rosati

(57) ABSTRACT

A Quantified Image Measurement System that creates accurate physical measurement data from digital pictures is disclosed. The system can use any image format and enhances the image file with measurement data and data transformation information that enables the creation of any type of geometrical or dimensional measurement from the stored photograph. This file containing the original digital image along with the supplemental data is referred to as a Quantified Image File or QIF. The QIF can be shared with other systems via email, cloud syncing or other types of sharing technology. Once shared, existing systems such as CAD applications or web/cloud servers can use the QIF and the associated QIF processing software routines to extract physical measurement data and use the data for subsequent processing or building geometrically accurate models of the objects or scene in the image. Additionally smart phones and other portable devices can use the QIF to make measure-
(Continued)

ments on the spot or share between portable devices. In addition, the quantified image measurement system of this invention eliminates the need for capturing the image from any particular viewpoint by using multiple reference points and software algorithms to correct for any off-angle distortions.

16 Claims, 12 Drawing Sheets

(51) Int. Cl.
*G06T 5/00* (2006.01)
*G06T 7/73* (2017.01)
*G06T 7/90* (2017.01)
*G06K 9/42* (2006.01)

(52) U.S. Cl.
CPC ............... *G06T 7/74* (2017.01); *G06T 7/90* (2017.01); *G06T 2207/20021* (2013.01); *G06T 2207/20081* (2013.01); *G06T 2207/30168* (2013.01)

(56) References Cited

U.S. PATENT DOCUMENTS

| | | | |
|---|---|---|---|
| 5,481,622 A | 1/1996 | Gerhardt et al. | |
| 5,699,444 A | 12/1997 | Palm | |
| 6,125,197 A | 9/2000 | Mack et al. | |
| 6,356,298 B1* | 3/2002 | Abe | H04N 13/0207 348/47 |
| 6,415,051 B1 | 7/2002 | Callari et al. | |
| 7,058,213 B2 | 6/2006 | Rubbert et al. | |
| 7,239,732 B1* | 7/2007 | Yamada | A61B 6/463 128/922 |
| 7,256,899 B1 | 8/2007 | Faul et al. | |
| 8,031,909 B2 | 10/2011 | Se et al. | |
| 8,294,958 B2* | 10/2012 | Paterson | G01B 11/2518 358/1.9 |
| 8,605,987 B2 | 12/2013 | Chao et al. | |
| 8,885,916 B1* | 11/2014 | Maurer | G06K 9/6202 348/137 |
| 8,922,647 B2 | 12/2014 | Crothers et al. | |
| 9,131,223 B1 | 9/2015 | Rangarajan et al. | |
| 9,157,757 B1* | 10/2015 | Liao | G01C 21/20 |
| 2003/0012410 A1 | 1/2003 | Navab et al. | |
| 2003/0068098 A1 | 4/2003 | Rondinelli et al. | |
| 2003/0091227 A1* | 5/2003 | Chang | G06T 17/10 382/154 |
| 2003/0095338 A1 | 5/2003 | Singh et al. | |
| 2003/0128401 A1* | 7/2003 | Conrow | H04N 1/00002 358/300 |
| 2004/0095385 A1 | 5/2004 | Koo et al. | |
| 2004/0239688 A1 | 12/2004 | Krajec | |
| 2005/0031167 A1 | 2/2005 | Hu et al. | |
| 2005/0123179 A1* | 6/2005 | Chen | G06T 3/60 382/128 |
| 2005/0213082 A1 | 9/2005 | Dibernardo et al. | |
| 2005/0261849 A1* | 11/2005 | Kochi | H04N 5/217 702/85 |
| 2006/0017720 A1 | 1/2006 | Li | |
| 2006/0210192 A1* | 9/2006 | Orhun | G06K 9/32 382/275 |
| 2007/0065004 A1* | 3/2007 | Kochi | G01C 11/06 382/162 |
| 2008/0062164 A1* | 3/2008 | Bassi | H04N 9/3147 345/214 |
| 2008/0075324 A1 | 3/2008 | Sato et al. | |
| 2008/0095468 A1* | 4/2008 | Klemmer | H04N 9/3194 382/285 |
| 2008/0123937 A1* | 5/2008 | Arias Estrada | G06T 7/593 382/154 |
| 2008/0159595 A1 | 7/2008 | Park et al. | |
| 2008/0201101 A1 | 8/2008 | Hebert et al. | |
| 2009/0268214 A1 | 10/2009 | Lucic et al. | |
| 2010/0017178 A1 | 1/2010 | Tsuk et al. | |
| 2010/0053591 A1 | 3/2010 | Gibson et al. | |
| 2010/0104199 A1* | 4/2010 | Zhang | G06K 9/00798 382/199 |
| 2010/0201809 A1* | 8/2010 | Oyama | G01C 3/14 348/135 |
| 2011/0050640 A1* | 3/2011 | Lundback | G06F 3/041 345/175 |
| 2011/0123135 A1 | 5/2011 | Hsieh et al. | |
| 2012/0007943 A1 | 1/2012 | Tytgat | |
| 2012/0020518 A1 | 1/2012 | Taguchi | |
| 2012/0062702 A1 | 3/2012 | Jiang et al. | |
| 2012/0176380 A1 | 7/2012 | Wang et al. | |
| 2012/0218437 A1 | 8/2012 | Hermary et al. | |
| 2012/0287240 A1* | 11/2012 | Grossmann | G06T 7/0018 348/46 |
| 2012/0293667 A1 | 11/2012 | Baba et al. | |
| 2013/0076894 A1* | 3/2013 | Osman | H04W 4/02 348/135 |
| 2013/0076896 A1 | 3/2013 | Takabayashi et al. | |
| 2013/0136341 A1 | 5/2013 | Yamamoto | |
| 2013/0162785 A1 | 6/2013 | Michot et al. | |
| 2013/0278755 A1 | 10/2013 | Starns et al. | |
| 2013/0307932 A1 | 11/2013 | Mestha et al. | |
| 2013/0321585 A1 | 12/2013 | Hassebrook et al. | |
| 2013/0324830 A1 | 12/2013 | Bernal et al. | |
| 2014/0140579 A1 | 5/2014 | Takemoto | |
| 2014/0143096 A1* | 5/2014 | Stubert | G06T 11/00 705/26.63 |
| 2014/0210950 A1 | 7/2014 | Atanassov et al. | |
| 2014/0211018 A1 | 7/2014 | De Lima et al. | |
| 2014/0307100 A1 | 10/2014 | Myllykoski et al. | |
| 2014/0314276 A1* | 10/2014 | Wexler | G06T 7/602 382/103 |
| 2015/0260509 A1 | 9/2015 | Kofman et al. | |
| 2015/0292873 A1 | 10/2015 | Chou et al. | |
| 2015/0316368 A1 | 11/2015 | Moench et al. | |
| 2015/0330775 A1 | 11/2015 | Basevi et al. | |
| 2015/0331576 A1 | 11/2015 | Piya et al. | |
| 2015/0369593 A1 | 12/2015 | Myllykoski | |
| 2016/0044301 A1 | 2/2016 | Jovanovich et al. | |
| 2016/0134860 A1 | 5/2016 | Jovanovich et al. | |
| 2016/0227193 A1 | 8/2016 | Osterwood et al. | |
| 2016/0260250 A1 | 9/2016 | Jovanovich et al. | |
| 2017/0249745 A1* | 8/2017 | Fiala | G06T 7/13 |
| 2017/0337701 A1 | 11/2017 | Jovanovich et al. | |
| 2018/0021597 A1* | 1/2018 | Berlinger | A61N 5/1049 |

FOREIGN PATENT DOCUMENTS

| | | |
|---|---|---|
| EP | 2554940 A1 | 2/2013 |
| FR | 2924560 A1 | 6/2009 |
| WO | WO-2006027339 A2 | 3/2006 |
| WO | WO-2007030026 A1 | 3/2007 |
| WO | WO-2013033787 A1 | 3/2013 |
| WO | WO-2013155379 A2 | 10/2013 |
| WO | WO-2015023483 A1 | 2/2015 |
| WO | WO-2015073590 A2 | 5/2015 |
| WO | WO-2015134794 A2 | 9/2015 |
| WO | WO-2015134795 A2 | 9/2015 |

OTHER PUBLICATIONS

Horn et al. Determining optical Flow: a retrospective. Artificial Intelligence 17:185-203 (1981).

Kawasaki et al. Entire model acquisition system using handheld 3D digitizer. 3D Data Processing, Visualization and Transmission, 2004. 3DPVT 2004. Proceedings. 2nd International Symposium on. (pp. 478-485) (Sep. 6-9, 2004).

Klein et al. Parallel Tracking and Mapping for Small AR Workspaces. Mixed and Augmented Reality. ISMAR 2007. 6th IEEE and ACM International Symposium on.(10 pgs) (Nov. 13-16, 2007).

Newcombe et al. DTAM: Dense Tracking and Mapping in Real Time. Computer Vision (ICCV), 2011 IEEE International Conference on. (8 pgs) (Nov. 6-13, 2011).

(56) References Cited

OTHER PUBLICATIONS

Nguyen et al. A Simple Method for Range Finding via Laser Triangulation. Technical Document 2734. published by the United States Naval Command, Control and Ocean Surveillance Center, RDT&E Division and NRAD (12 pgs) (Jan. 1995).
PCT/US2013/036314 International Preliminary Report on Patentability dated Oct. 23, 2014.
PCT/US2013/036314 International Search Report and Written Opinion dated Nov. 15, 2013.
PCT/US2014/049900 International Preliminary Report on Patentability dated Feb. 18, 2016.
PCT/US2014/049900 International Search Report and Written Opinion dated Dec. 10, 2014.
PCT/US2014/065309 International Preliminary Report on Patentability dated May 26, 2016.
PCT/US2014/065309 International Search Report and Written Opinion dated May 20, 2015.
PCT/US2015/019040 International Preliminary Report on Patentability dated Sep. 15, 2016.
PCT/US2015/019040 International Search Report and Written Opinion dated Feb. 17, 2016.
PCT/US2015/019041 International Preliminary Report on Patentability dated Sep. 15, 2016.
PCT/US2015/019041 International Search Report and Written Opinion dated Mar. 31, 2016.
Tanskanen et al. Live Metric 3D Reconstruction on Mobile Phones. Computer Vision (ICCV), 2013 IEEE International Conference on. (pp. 65-72) (Dec. 1-8, 2013).
U.S. Appl. No. 13/861,534 Office Action dated Dec. 24, 2015.
U.S. Appl. No. 13/861,534 Office Action dated Jan. 30, 2015.
U.S. Appl. No. 13/861,685 Office Action dated Dec. 4, 2015.
U.S. Appl. No. 13/861,685 Office Action dated Jul. 27, 2016.
U.S. Appl. No. 13/861,685 Office Action dated Mar. 13, 2015.
U.S. Appl. No. 14/308,874 Office Action dated Apr. 8, 2016.
U.S. Appl. No. 14/308,874 Office Action dated Aug. 3, 2017.
U.S. Appl. No. 14/452,937 Office Action dated Jan. 12, 2017.
U.S. Appl. No. 14/539,924 Office Action dated Oct. 6, 2016.
U.S. Appl. No. 14/639,912 Office Action dated Jan. 11, 2017.
U.S. Appl. No. 15/123,662 Office Action dated Dec. 28, 2017.
Zucchelli. Optical Flow based Structure from Motion. Doctoral Dissertation (142 pgs) (2002).
U.S. Appl. No. 15/123,662 Notice of Allowance dated Apr. 27, 2018.
U.S. Appl. No. 14/308,874 Office Action dated Apr. 3, 2018.

\* cited by examiner

IMAGE BASED MEASUREMENT SYSTEM

TECHNICAL FIELD OF THE INVENTION

The present invention generally relates to optical measuring systems, more specifically to optical measuring systems for gathering geometric data relative to two dimension of objects from photographic data from a range of possible camera viewing angles and distance of the two dimensional surface of the object from the camera.

BACKGROUND OF THE INVENTION

The present invention relates generally to measurement systems and more specifically it relates to an image data capture and processing system, consisting of a digital imaging device, computer and software that generates correction data sets from which real world coordinate information with planarity, scale, aspect, and innate dimensional qualities can be extracted from the captured image in order to extract real dimensional data from the imaged objects.

In the following specification, we use the name Non-Orthographic Measurement System or Quantified Image Measurement System to refer to a system that extracts real world coordinate accurate 2-dimensional data from non-orthographically imaged objects. This includes not just extracting accurate real world measurements but also data that can be used to determine any measurement of a 2-dimensions surface of an object within the orthographically or non-orthographically imaged portion of the object's two dimensional surface.

This invention eliminates a key problem of electronic distance measurement tools currently in the market: the need for the measurement taker to transcribe measurements and create manual associations with photos, drawings, blueprints, or sketches. Additionally these same devices typically only capture measurements one at a time and do not have the ability to share the information easily or seamlessly with other systems that can use the measurement data for additional processing. With the advent of mobile devices equipped with megapixel digital cameras, this invention provides a means to automatically calculate accurate physical measurements between any of the pixels or sets of pixels within the photo. The system preferably can use nearly any image format including but not limited to JPEG, TIFF, BMP, PDF, GIF, PNG, EXIF and enhances the image file with measurement data and data transformation information that enables the creation of any type of geometrical or dimensional measurement from the stored photograph. This file containing the original digital image along with the supplemental data is referred to as a Quantified Image File ("QIF").

The QIF can be shared with other systems via email, cloud syncing or other types of sharing technology. Once shared, existing systems such as CAD applications or web/cloud servers can use the QIF and the associated QIF processing software routines to extract physical measurement data and use the data for subsequent processing or building geometrically accurate models of the objects or scene in the image. Additionally smart phones and other portable devices can use the QIF to make measurements on the spot or share between portable devices. While some similar systems may purport to extract measurements from image files, they differ from the present invention by requiring the user to capture the picture from a particular viewpoint, most commonly from the (orthographic) viewpoint that is perpendicular to the scene or objects to be measured. The Quantified Image Measurement System of this invention eliminates the need for capturing the image from any particular viewpoint by using multiple reference points and software algorithms to correct for any off-angle distortions.

There is a need for an improved optical system for measuring tools which extract dimensional information of objects imaged from non-orthographical viewing angle(s) and allows for later extraction of additional measurements without reimaging of the object.

BRIEF SUMMARY OF THE INVENTION

The invention generally relates to a 2 dimensional textures with applied transforms which includes a digital imaging sensor, a reference object or reference template, a calibration system, a computing device, and software to process the digital imaging data.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a Quantified Image Measurement System for an image data capture and processing system, consisting of a digital imaging device, reference object or reference template, computer and software that generates data sets for correction of non-orthographic distortions, with planarity, scale, aspect, and innate dimensional qualities.

Another object is to provide a Quantified Image Measurement System that allows a digital camera or imager data to be corrected for a variety of lens distortions by using a software system.

Another object is to provide a Quantified Image Measurement System that has a computer and software system that integrates digital image data with a known reference object or reference template to create a set of correction data for the information in a 2-dimensional non-orthographic image with corrected planarity and distortion rectified information.

Another object is to provide a Quantified Image Measurement System that has a computer and software system that integrates digital image data with reference object or reference template data, to mathematically determine the properties of the scene from an orthographic point of view.

Another object is to provide a Quantified Image Measurement System that has a software system that integrates the planarity, scalar, and aspect information, to create a set of mathematical data that can be used to extract accurate real world measurements and that can be exported in a variety of common file formats.

Another object is to provide a Quantified Image Measurement System that has a software system that creates additional descriptive notation in or with the common file format, to describe the image pixel scalar, dimension and aspect values, at a point of planarity.

Another object is to provide a Quantified Image Measurement System that has a software system that displays correct geometrical measurements superimposed or adjacent to the original image.

Another object is to provide a Quantified Image Measurement System that has a software system can export the set of mathematical data that can be used to extract accurate real world measurements and additional descriptive notation.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

Another object is to provide a system for determining QIF dimensional characterization data to be stored with (or imbedded in) the image data for later use in extracting actual dimensional data of objects imaged in the image.

Another object is to provide an active image projections method alternative to the passive method of placing a reference pattern from which QIF characterization data can be determined and then used to extract dimensional data of objects in the image.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The present invention generally relates to an improved optical system for extracting measurement information from an image of the 2-dimensional surface of an object taken from a non-orthographic viewing angle and in the process extracting correction data sets for image distortions caused by a non-orthographic viewing angle. The system creates geometrically correct real world measurements coordinates from an image taken from an arbitrary viewing angle.

A. Overview

Figure 1:
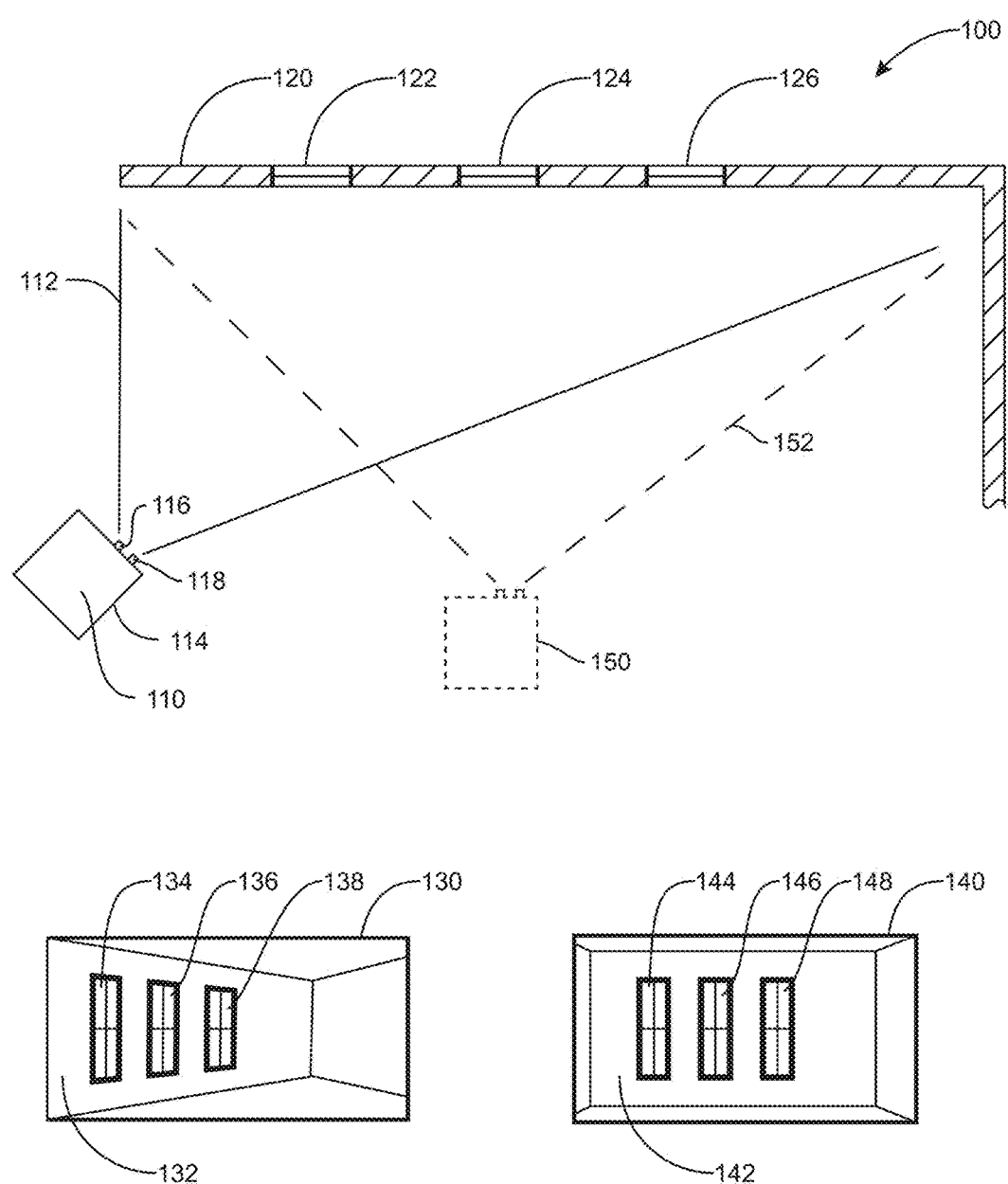
FIG. 1 illustrates top down view of a an non-orthographic image capture system in comparison to an orthographic image of a wall with three windows.

FIG. 1 illustrates an object (a wall 120 with windows 122, 124, 126) being captured 100 in photographic form by a non-orthographic image measurement system 110. FIG. 1 also illustrates two images 130 and 140 of the object 120. The first image 130 is a conventional photographic image of the object 120 taken from a non-orthographic arbitrary viewing angle 112. The second image 140 is a view of the object 120 as would be seen from a virtual viewing angle 152. In this case the virtual viewing angle 152 is an orthographic viewing angle of the object as would be seen from a virtual camera 150. In view 130 the object (wall 120 with windows 122, 124, 126) are seen in a perspective view as wall 132, and windows 134, 136, and 138: the farthest window 138 appears smallest. In the orthographic view 140, object (wall 120 with windows 122, 124, 126) are seen in an orthographic perspective as wall 132, and windows 134, 136, and 138: the windows which are the same size appear to be the same size in this image.

The components of the non-orthographic image measurement system 110 illustrated in FIG. 1 include the housing 114, a digital imaging optics and sensor (camera 116), and data processing hardware and software (non-shown in this figure). The calibration system, computing device, and software to process the image data are discussed below.

B. Camera

The camera 116 is optical data capture device, with the output being preferably having multiple color fields in a pattern or array, and is commonly known as a digital camera. The camera function is to capture the color image data within a scene, including the reference template data. In other embodiments a black and white camera would work, almost as well, as well or in some cases better than a color camera. In some embodiments of the orthographic image capture system, it may be desirable to employ a filter on the camera that enhances the image of the reference template for the optical data capture device.

The camera 116 is preferably a digital device that directly records and stores photographic images in digital form. Capture is usually accomplished by use of camera optics (not shown) which capture incoming light and a photosensor (not shown), which transforms the light intensity and frequency into colors. The photosensors are typically constructed in an array, that allows for multiple individual pixels to be generated, with each pixel having a unique area of light capture. The data from the multiple array of photosensors is then stored as an image. These stored images can be uploaded to a computer immediately, stored in the camera, or stored in a memory module.

The camera may be a digital camera, that stores images to memory, that transmits images, or otherwise makes image data available to a computing device. In some embodiments, the camera shares a housing with the computing device. In some embodiments, the camera includes a computer that performs preprocessing of data to generate and imbed information about the image that can later be used by the onboard computer and/or an external computer to which the image data is transmitted or otherwise made available.

A standard digital camera and an associated data processor platform where the digital camera and data processor may be integrated into a single device such as smart phone, tablet or other portable or stationary device with an integrated or accessory camera, or the data processor may be separate from the camera device such as processing the digital photo data on a standalone computer or using a cloud-based remote data processor.

C. Reference Template or Reference Object

There is great flexibility on the design of the reference template. It should be largely a 2D pattern, although 3D reference objects/templates are also acceptable (for example, an electrical power outlet). Generally, a minimum of four coplanar reference points or fiducials are required in the reference template in order to generate the correction data set that can correct for the non-orthographic camera angle and produce accurate measurements of the objects in the image. In one embodiment of this invention, a pattern of five bulls-eyes is used, arranged as one bulls-eye at each corner of a square and the fifth bulls-eye at the center of the square. The essential requirement is that the Quantified Image Measurement System has knowledge of the exact geometry of the reference template. In processing, the system will recognize and identify key features (fiducials) of the reference template in each image. Therefore, it is advantageous that the reference template pattern be chosen for providing speed and ease of recognition.

The design of the reference template requires a set of fiducial markers that comport with the detection algorithm to enable range and accuracy. One embodiment makes use of circular fiducial markers to enable localization with a Hough circle detection algorithm. Another embodiment uses a graded bow-tie corner which allows robust sub-pixel corner detection while minimizing false corner detection. These components, and others, can be combined to facilitate a multi-tier detection strategy for optimal robustness.

Figure 2:
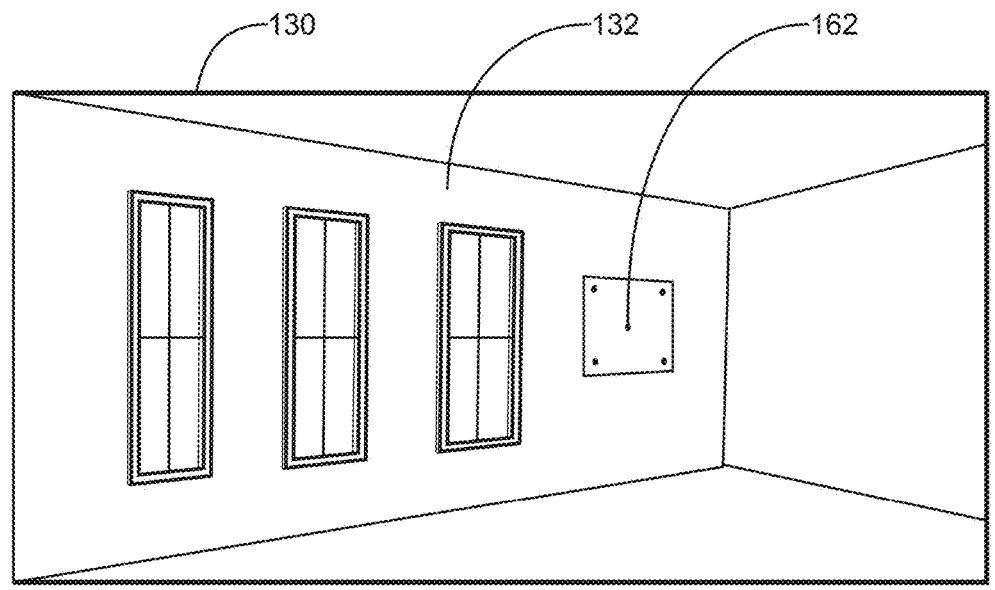
FIG. 2 illustrates a captured image taken from a non-orthographic viewing angle.
Figure 3:
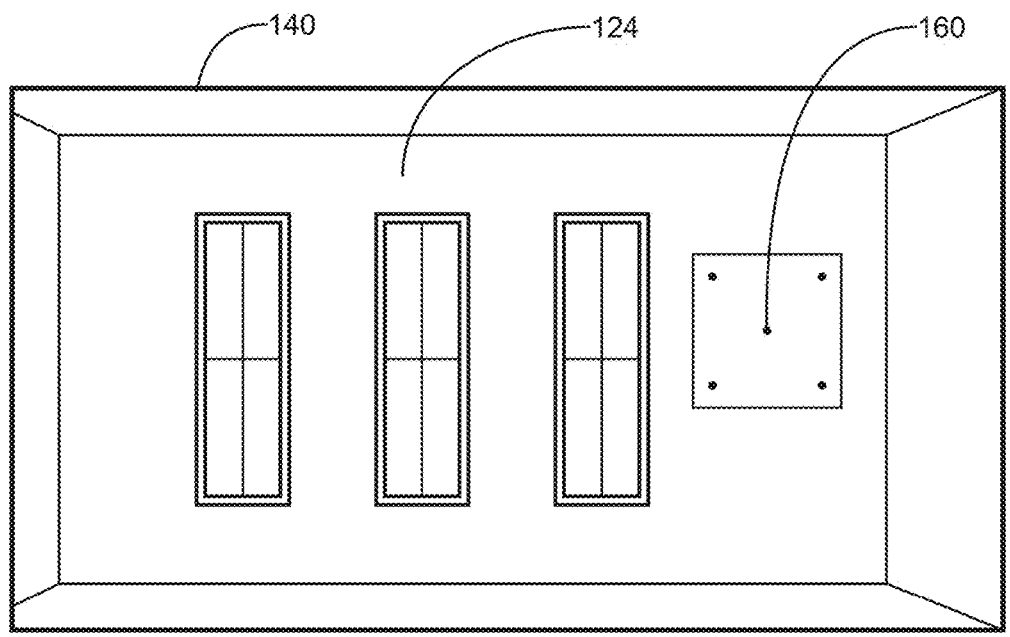
FIG. 3 illustrates an orthographic image of the wall.

FIG. 2 and FIG. 3 illustrate the images 130 and 140 respectively from FIG. 1 in greater detail. Specifically these illustrations include illustrations of a passive reference template pattern 162 and 160 respectively as seen in the actual image and a virtual orthographic image. The reference template pattern illustrated in FIG. 2 and FIG. 3 is shown in greater detail in FIG. 4. FIG. 2 illustrates how the camera sees the pattern 162; while, FIG. 3 illustrates how the pattern would look from an orthographic viewing angle.

Figure 4:
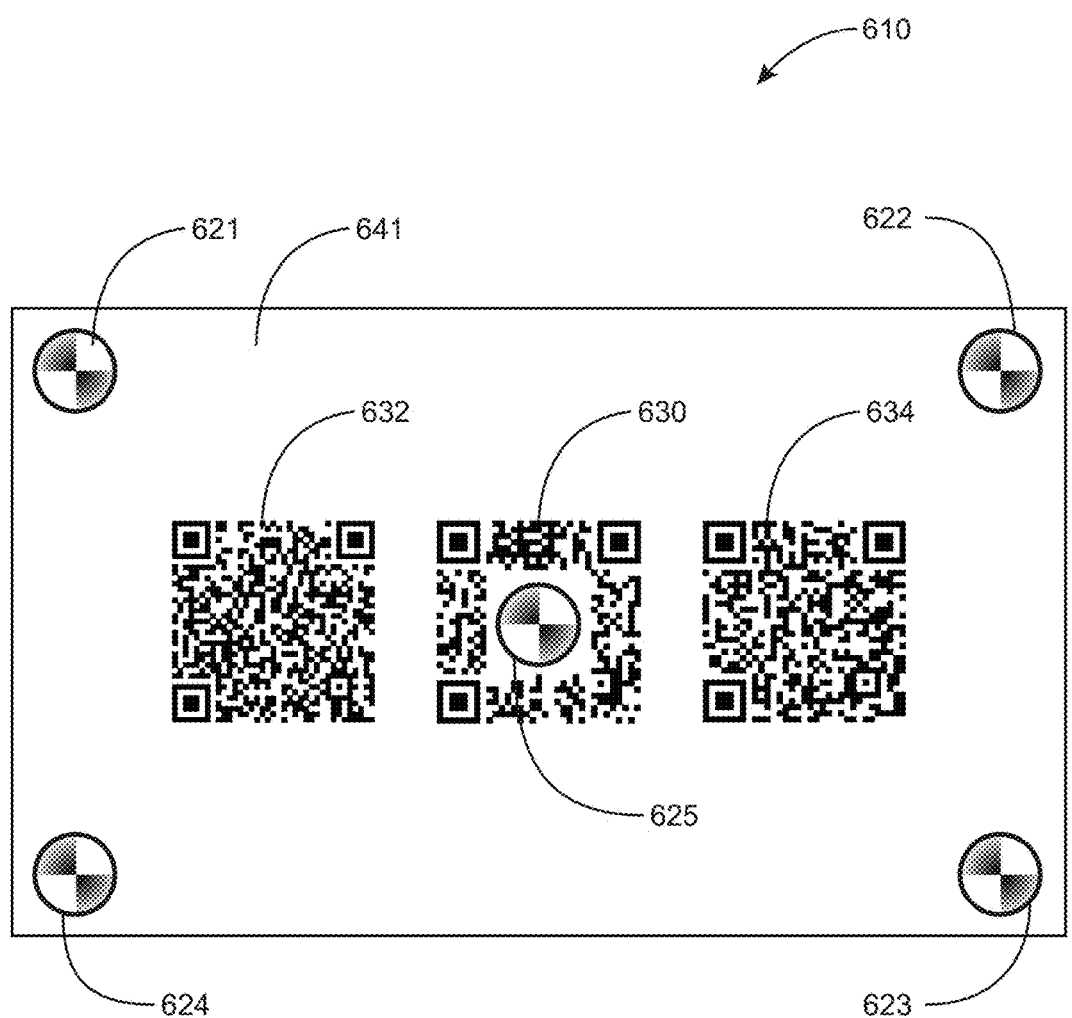
FIG. 4 illustrates an embodiment of a passive pattern reference template to be placed on a two dimensional surface of an object to be photographed.

As previously mentioned FIG. 4 illustrates an embodiment of a reference template pattern. This pattern is good for capturing non-orthographic images of a two-dimensional surface of an object such as the wall 120 in FIG. 1. Note that the non-orthographic view angle is illustrated as primarily non-orthographic in one dimension: pan angle of the camera. In other uses of the system the tilt angle or both the pan and tilt angle of the camera may be non-orthographic. The pattern shown in FIG. 4 provides enough information in all three non-orthographic conditions: pan off angle, tilt off angle or both pan and tilt off angle.

FIG. 4 illustrates an embodiment of the image-based dimensioning method and system employing a reference template pattern to be placed on within the scene to be photographed. The embodiment of the pattern label 610 illustrated in FIG. 4 is a pattern printed on a label 641 which is attached to the object to be photographed (not shown). The pattern is comprised of the five point patterns 621, 622, 623, 624 and 625. Other point patterns are possible and other configurations of points are also possible. Some alternative configurations are illustrated in FIG. 5 on labels 611, 612, 613, 614, 615, and 616 with 611 being most like the point configuration in the embodiment illustrated in FIG. 4.

FIG. 4 also illustrates an embodiment with other parts—note the three UID's 630, 632, and 634. In this embodiment, the left most UID 632 illustrates a UID that represents a site that a UID decoder will direct the user's electronic device to a location where the image-based measuring system software can be downloaded to the user's electronic device. The UID 634 on the right most side, when decoded by the user, will notify the user of special promotions for a sponsor or the store, possibly related to the object on which the label is affixed or placed on the object to be imaged, characterized and ultimately dimensioned. The center UID 630 in the embodiment shown has a point image 625 incorporated into the UID image 630.

In the embodiment shown, the UID may provide the user and camera other information about the image or related images. For example, the UID may provide the user or camera with information about the product, such as pantone colors, weight, manufacturer, model number variations available etc. It may also provide the camera with information as to the type and size of pattern used which will expedite automated discovery of the registration points 621, 622, 623, 624 and 625.

Figure 5:
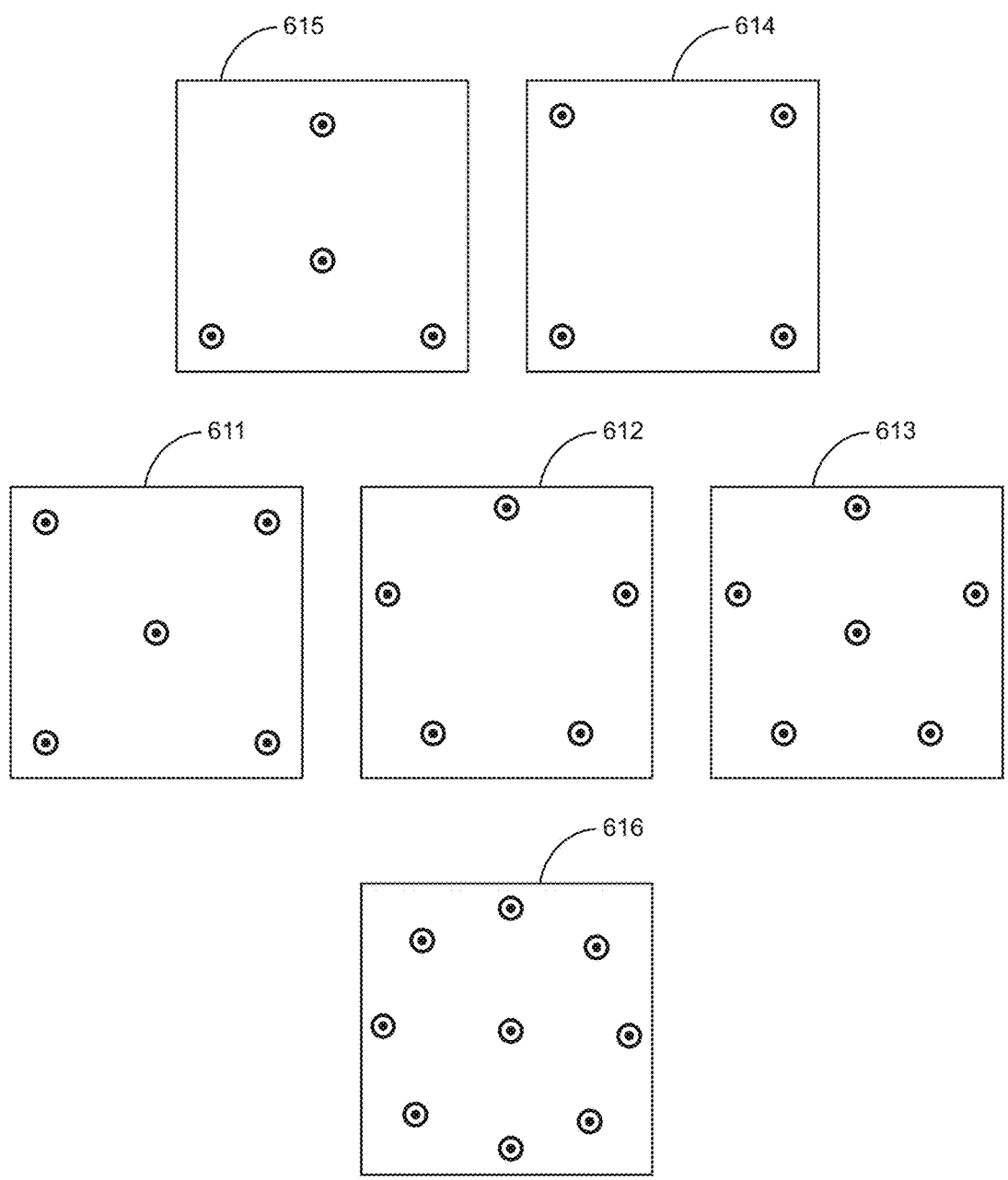
FIG. 5 illustrates several embodiments of other passive pattern reference templates to be placed on or proximate to an object to be photographed.

FIG. 5 illustrates examples of the nearly limitless patterns that can be used in place of, or in addition to, the pattern illustrated in FIG. 4. However, in embodiments that also make corrections to an image captured by a camera, based on the distortions caused the camera's optic system, patterns with more data points would be more desirable.

In alternative embodiments the fiducial points in the pattern may be printed or may be electromagnetic emitting devices such as light emitting diodes (LEDs). Similarly, the reference template may be a printed pattern, a reference pattern presented on a dynamic display such as a flat-panel display, or the reference pattern may be printed on glass or plastic or similar partially transparent medium with a backlight illuminating it from behind. In other words, the reference template may be purely passive or it may be light emitting. A light emitting reference template may aid in automatic detection of the reference template in certain ambient light conditions such as low light. In either case the wavelength of the fiducials in the pattern may be selected so that via digital filters, the fiducial locations may be easier and quicker to identify in a digital image. For example the wavelength may be of a green or a red color. Then a band pass digital filter can be used so that the fiducials will stand out in the filtered image.

Figure 6:
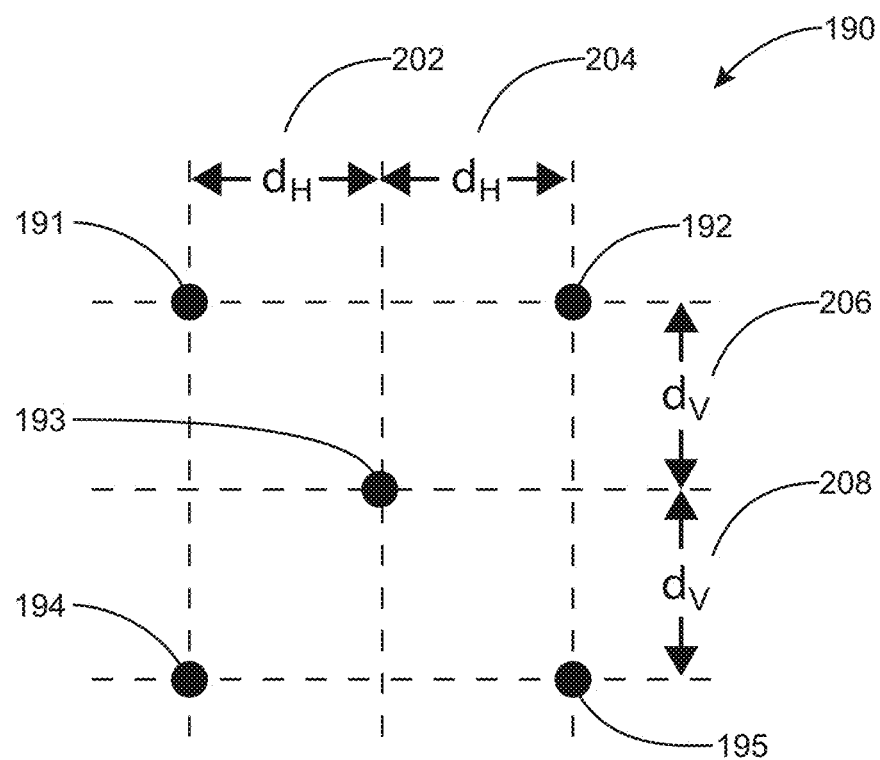
FIG. 6 illustrates key parameters of the reference template illustrated in FIG. 4.

FIG. 6 illustrates in greater detail important parameters of the template pattern illustrated in FIG. 4. The pattern has five points 191, 192, 193, 194, 195. It is important to this embodiment that the ratio of distances between the five points remain constant for different sized templates. The size of the template which is appropriate depends on distance between the object and camera. In one embodiment, the template fills most of a standard letter size piece of paper. In another embodiment the template fits on a 3-inch by 5-inch card. In another embodiment the template pattern fits on a postage-stamp-sized sticker. In the embodiment of the software, the dimensions for $d_V$ 206 and 208 and $d_H$ 202 and 204 may be different but the ratios remain the same. The reason to maintain the ratios is for faster pattern finding as discussed below. To determine the corrections or corrected measurements, the system must know which template was used in the image.

Active Illumination Reference Pattern: In another embodiment of this invention, the physical reference template that is placed into the scene to be measured is replaced by an active illumination reference pattern projected onto the scene. The light pattern projector is attached to the camera in a fixed and known manner such that reference pattern is projected onto the scene at a particular position and angle within to the camera's field of view. As with the passive reference template, the reference pattern projected by the active illumination projector contains a set of at least four fiducials and the processing system has complete knowledge of the reference pattern and the details of the fiducials. In a preferred embodiment, the light pattern projector consists of a laser beam and a diffractive optical element (DOE). Generally the light pattern projector can be made with any light source technology, including LED, incandescent lamp, arc lamp, fluorescent lamp, or laser, coupled with an optical imaging system usually comprised of lenses, and a pattern generating element which may be a DOE, a slide or transparency, a pattern of light emitters, or any other refractive, reflective, or diffractive component that has been configured to generate the desired reference pattern.

The Camera(s), Active Illumination device(s), and Software, may be integrated with the computer, software, and software controllers, within a single electro mechanical device such as a laptop, tablet, phone, PDA.

The triggering of the Active illumination may be synchronized with the panoramic view image capturing to capture multiple planar surfaces in a panoramic scene such as all of the walls of a room.

D. Computer

Figure 7:
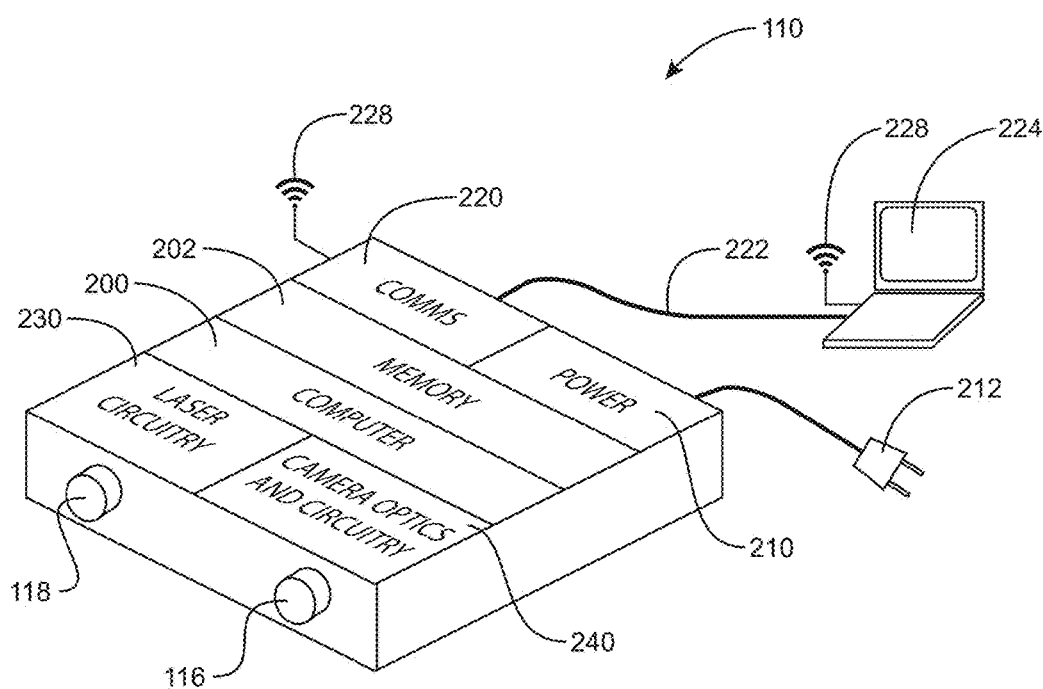
FIG. 7 illustrates an upper perspective view of an embodiment of a system with a Camera and supporting hardware and software.

Other major components of the Quantified Image Measurement System 110 are a computer and computer instruction sets (software) which perform processing of the image data collected by the camera 116. In the embodiment illustrated in FIG. 7, the computer is located in the same housing as the camera 116. In this embodiment the housing also contains a power supply and supporting circuitry for powering the device and connection(s) 212 for charging the power supply. The system 110 also includes communications circuitry 220 to communicate with wired 222 to other electronic devices 224 or wirelessly 228. The system 110 also includes memory(s) for storing instructions and picture data and supporting other functions of the system 110. The system 110 also includes circuitry 230 for supporting the active illumination system 118 and circuitry 240 for supporting the digital camera.

In the embodiment shown, all of the processing is handled by the CPU (not shown) in the on-board computer 200. However in other embodiments the processing tasks may be partially or totally performed by firmware or software programmed processors. In other embodiments, the onboard processors may perform some tasks and outside processors may perform other tasks. For example, the onboard processors may identify the locations of reference template pattern in the picture, calculate corrections due to the non-ortho-graphic image, save the information, and send it to another computer or data processors to complete other data processing tasks.

The Quantified Image Measurement System 110 requires that data processing tasks be performed. Regardless of the location of the data processing components or how the tasks are divided, data processing tasks must be accomplished. In the embodiment shown, an onboard computer 200, no external processing is required. However, the data can be exported to another digital device 224 which can perform the same or additional data processing tasks. For these purposes, a computer is a programmable machine designed to automatically carry out a sequence of arithmetic or logical operations. The particular sequence of operations can be changed readily, allowing the computer to solve more than one kind of problem.

E. Data Processing

This is a process system that allows for information or data to be manipulated in a desired fashion, via a programmable interface, with inputs, and results. The software system controls calibration, operation, timing, camera and active illumination control, data capture, data processing, data display and export.

Computer software or just software, is a collection of computer programs and related data that provides the instructions for telling a computer what to do and how to do it.

Figure 8:
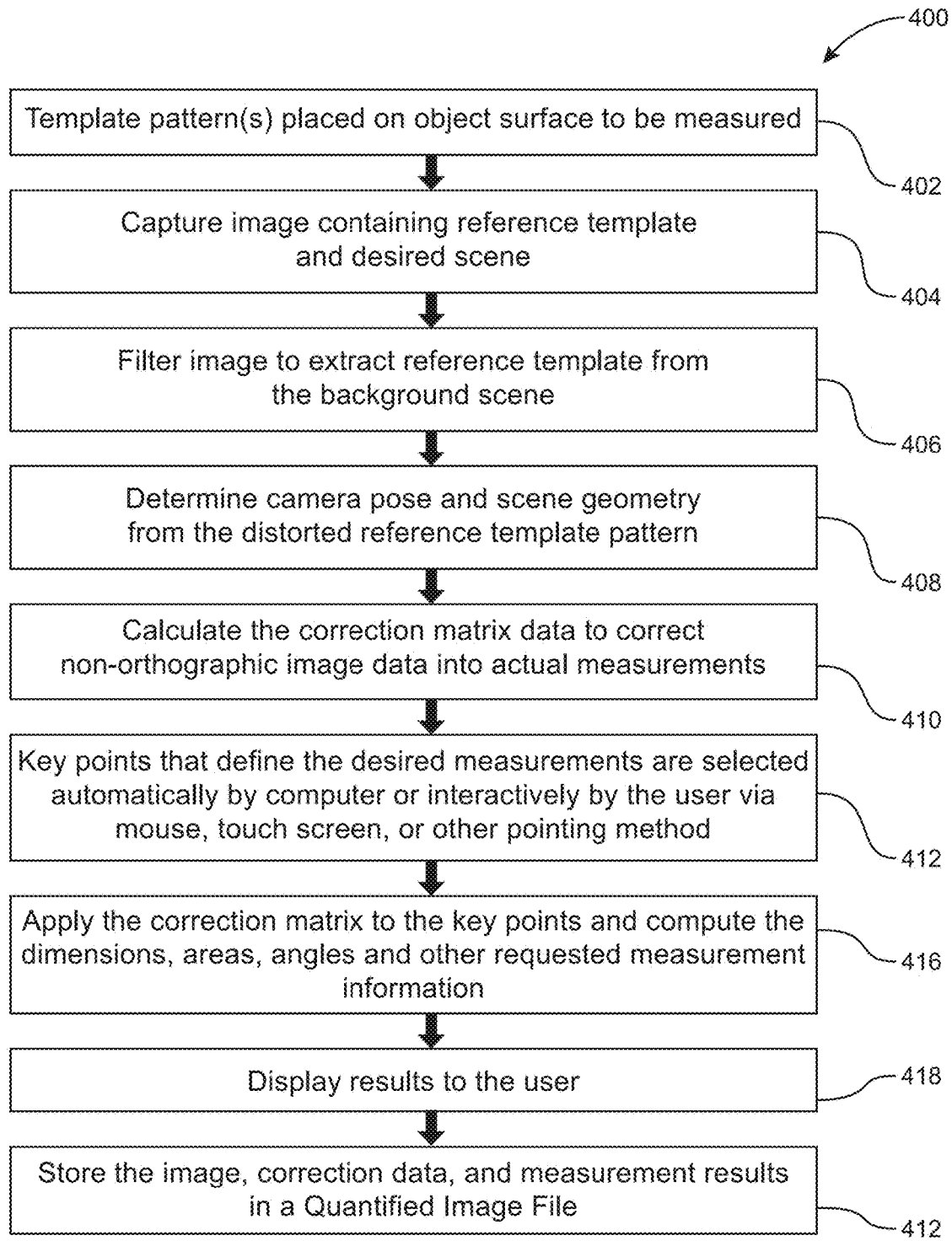
FIG. 8 illustrates an embodiment of data processing flow for generating the desired non-orthographic image distortion corrections.

FIG. 8 illustrates a flow chart 400 of major data processing steps for the software and hardware of an embodiment of a non-orthographic image measurement system. The first step illustrated identify the passive template(s) used in the scene 402. The next step is capturing of the digital image containing the reference template pattern 404. The next step is processing the image data to extract the position of characteristic elements of the reference template pattern 406. The software then calculates non-orthographic deformation data for the plane of the object 408 and 410. In the embodiment shown (other embodiments may skip to step 418), preplanned measurements of the surface such as lengths widths, area, angle are extracted from the image 412. The correction data is applied to the preselected non-orthographic measurements 414. The results are displayed to the user 416. In the embodiment shown, the user is also provided with the ability to identify key points to take a measurement of a distance or area or angle or other measurements to which the corrections are then applied to display user defined real world measurements.

Figure 10:
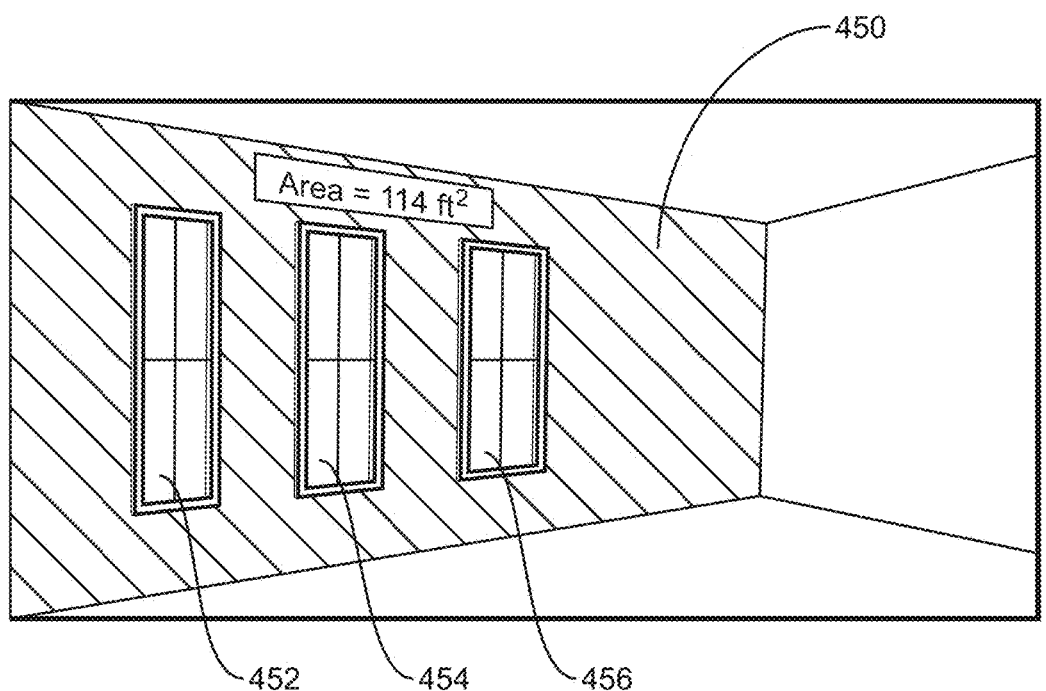
FIG. 10 illustrates an embodiment with an example of dimensional data which can be extracted from the digital image.

An example is illustrated in FIG. 10. Where the user has selected the area of the wall 450 minus the three windows 452, 454, 456 and provided with an answer of 114 square feet.

Figure 9:
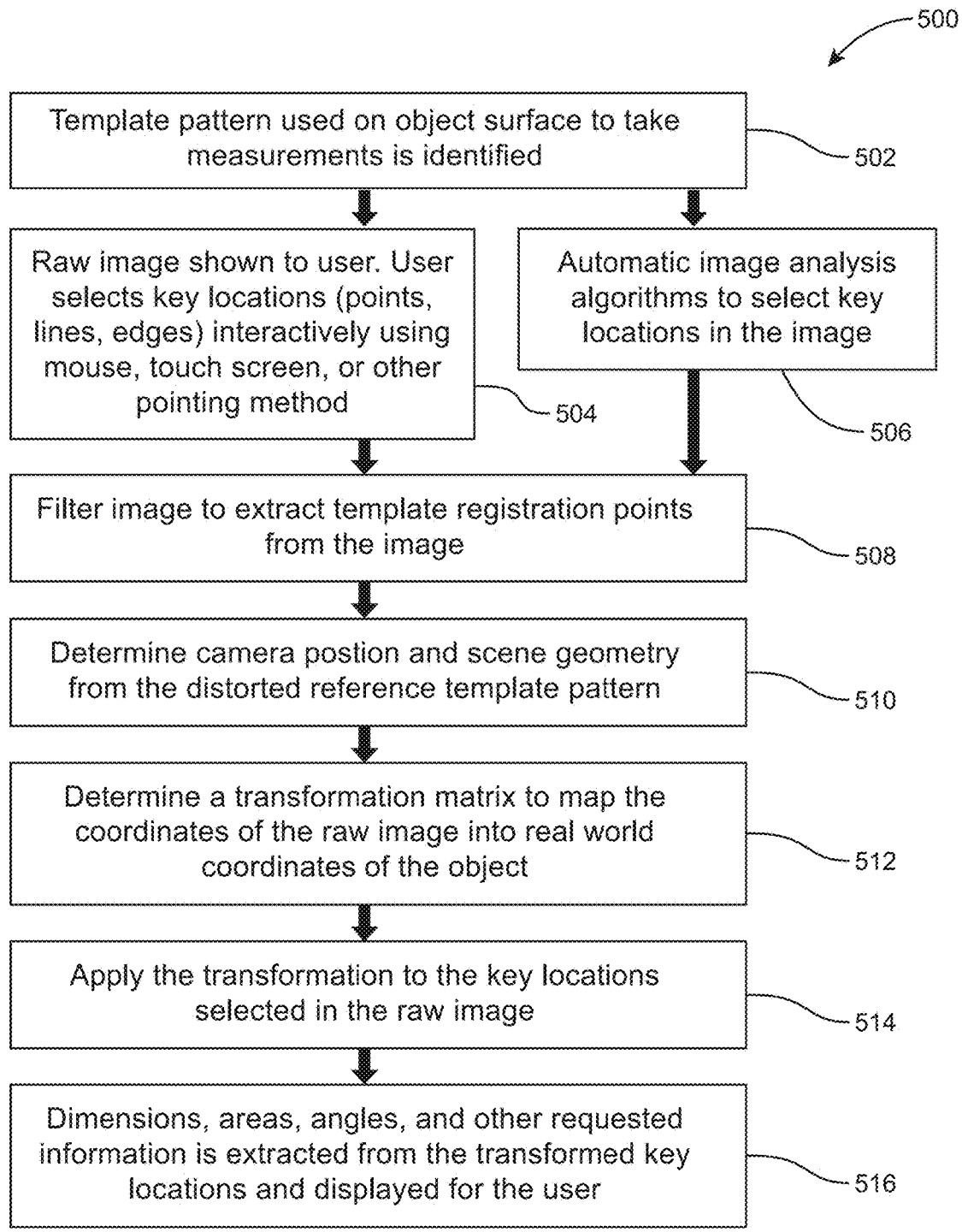
FIG. 9 illustrates an embodiment of data processing flow for generating correct world coordinate dimensions from a non-transformed raw image.

FIG. 9 illustrates an alternative embodiment of the data processing flow of a software implementation of a Quantified Image Measurement System. First the template pattern placed on the subject surface is identified either via query and user input or via a scan code on the template. Then the flow proceeds down two paths or one of two paths. The first path the user is shown the raw image and selects key dimension points of interest 504. The second path is that a separate routine automatically identifies key dimensional locations in the image 506. Meanwhile the software is analyzing the image to locate key geometric points of interest in the imaged reference template pattern on the imaged object 508. The software then determines a transformation matrix and scene geometry 510 and 512. The software then applies the transformation matrix to the key points of dimensional interest that were automatically determined and/or input by the user 514 and then the software presents the user with dimensional information requested or automatically selected in step 506.

1. Passive Reference Template Processing

Figure 15:
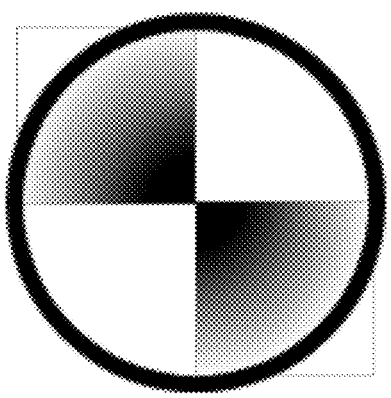
FIG. 15 illustrates the details of an embodiment of a reference fiducial and the key parameters used to accurately detect and locate the center of the fiducial.

FIG. 15 illustrates a preferred embodiment of a graded bow-tie fiducial marker 700. The benefits of this fiducial are the speed and accuracy of finding its center 702. This process is facilitated by the dark outer circle 710 surrounding a center space divided into four pie piece shaped quadrants 704, 714, 706 716. Two of the opposite quadrants 704, 714 are blank. The adjacent quadrants have a gradient 708, 718 that has a lower density near the outer ring 710 increasing in density toward the center 702.

The process for locating the centers of the fiducials is as follows:

a. Stage 1: Recognize and locate the reference template as a whole within the camera image. This is done using pattern recognition derived from a Haar Training Procedure as is available through the open source software routines such as OpenCV. The Haar Training procedure is presented with a series of positive samples that are to be recognized as the correct template pattern and is also presented with a series of negative samples that are to be rejected as not the template pattern. From this, pattern classifiers are generated that can be applied to the camera images to recognize the reference templates.

b. Stage 2: Hough Circle detection is used on the templates recognized in Stage 1 to find the circles 710 that contain the reference fiducials.

c. Stage 3: Corner detection is used within the circles detected in Stage 2 to locate the corner at the center 702 of the "bow-tie" that is contained within the circle 710. The reference fiducial position is defined as these center/corner locations. One embodiment of the corner detection used in this stage consists of a small number of local operators (for example, a 3×3 pixels mask or a 5×5 pixels mask) which detect the presence of two edges with a different directions. These masks are convolved with the image in the region of the circles found in Stage 2. The corner detection result has a sharp peak in its intensity at each location where a corner is detected. The gradient roll-off of the bow-tie density as it nears the circular boundary avoids creating false corners where the bow tie and circular boundary meet. In this way, only the corner at the center of the bow tie shape is detected by the corner detector. Corner detectors based on other approaches than the convolution mask described can also be used in this Stage.

Alternatively, the gradient roll-off of the bow tie density can be implemented in software during this corner detection operation. In this case, the physical reference template contains circular bow-tie patterns with no gradient roll-off. Once the circular fiducial region has been detected, it is multiplied by a mathematical circular mask of the same dimensions and position as the detected circular fiducial region. This mathematical mask has a value of 1.0 in the center area of the circle and rolls off gradually to a value of 0.0 at the outer edge of the circular region. The corner detector is then applied to the product of the original circular fiducial region and the circular mathematical mask. As with the physical graded bow-tie described in the previous paragraph, the product of the non-graded bow-tie with the mathematical mask results in an effective gradient bow-tie pattern input to the corner detection subsystem.

d. Stage 4: As mentioned above, the corner detector output increases as a corner is approached and reaches a peak at the corner location. Since the digital image is pixilated and since there may also be noise in the image, the intensity profile rising to a peak corresponding to a corner location may itself be noisy. By analyzing the neighborhood around the peak and calculating the centroid location, (or alternatively the median location, or other calculated representation of the center of a distribution) of the neighborhood of pixels containing the peak, the true location of the corner can be estimated with subpixel accuracy.

Alternatively, the subpixel location of a corner can be found by calculating the intersection point of lines tangent to the edges that make up the detected corner. These and other corner detectors are described in the literature and this invention does not rely on the use of any specific corner detection method. The open source computer vision library, OpenCV, offers multiple corner detectors that could perform this operation.

The template calibration can be further improved by increasing the number of fiducial targets beyond the minimum requirement to facilitate error detection and re-calibration strategies. In theory, four co-planar markers are sufficient to solve the homography mapping and enable measurement. One method for improving accuracy is to include additional fiducial markers in the template (>4) to test the alignment accuracy and trigger a 2nd tier re-calibration if necessary. Another uses the additional markers to drive an over-fit homography based on least squares, least median, random sample consensus, etc. algorithms. Such an approach minimizes error due to one/several poorly detected fiducial markers while broadening the usable range and detection angle and thus improving the robustness of the system.

Figure 11:
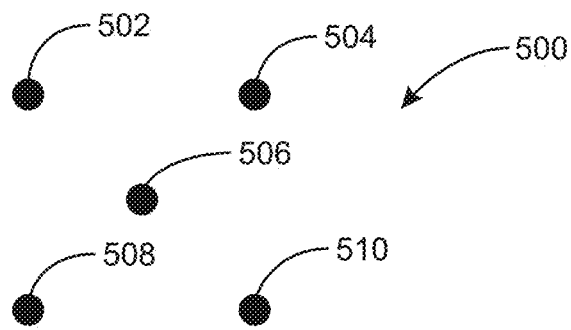
FIG. 11 illustrates a undistorted template pattern of FIG. 4.
Figure 12:
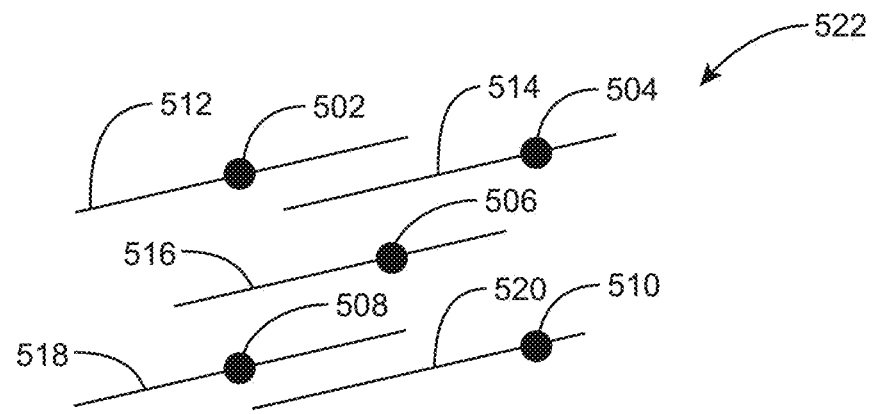
FIG. 12 illustrates a non-orthogonal image distorted template pattern.
Figure 13:
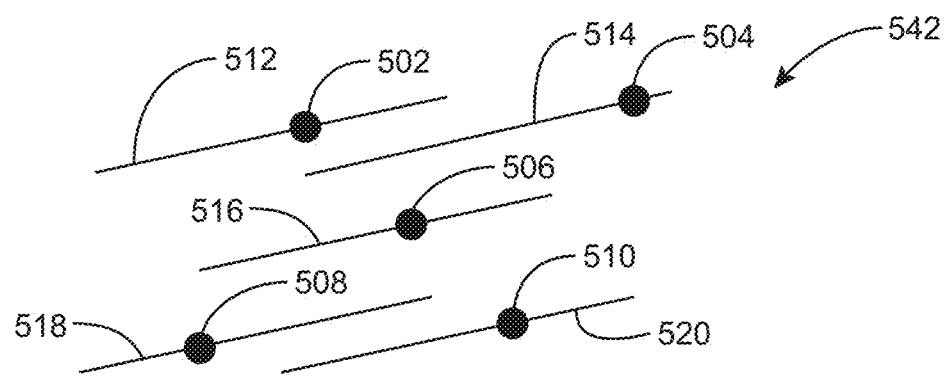
FIG. 13 illustrates another non-orthogonal image distorted template pattern.

2. Active Illumination Reference Pattern Processing:

FIG. 11 illustrates an undistorted projected pattern. FIG. 12 and FIG. 13 illustrate examples of distortion of the pattern that results from projecting onto a surface from an angle in an embodiment of the Quantified Image Measurement System. Similar distortions occur in the image of a reference template pattern when the photographing camera is at an angle with respect to the plane of the reference template.

The distortion(s) illustrated in FIG. 12 reflects a camera angle similar to the angle illustrated in FIG. 1: of a wall—taken from the left, angled to right (horizontal pan right and horizontal to the wall (i.e., no vertical tilt up or down).

The distortion(s) illustrated in FIG. 13 reflects a camera angle similar to the angle illustrated in FIG. 1: of a wall—taken from the left angled to right (horizontal pan right) and but with the camera lowered and looking up at the wall (i.e. vertical tilt up). Note that the points in the pattern 502, 504, 506, 508 move along line segments 512, 514, 516 and 518 respectively.

Figure 14:
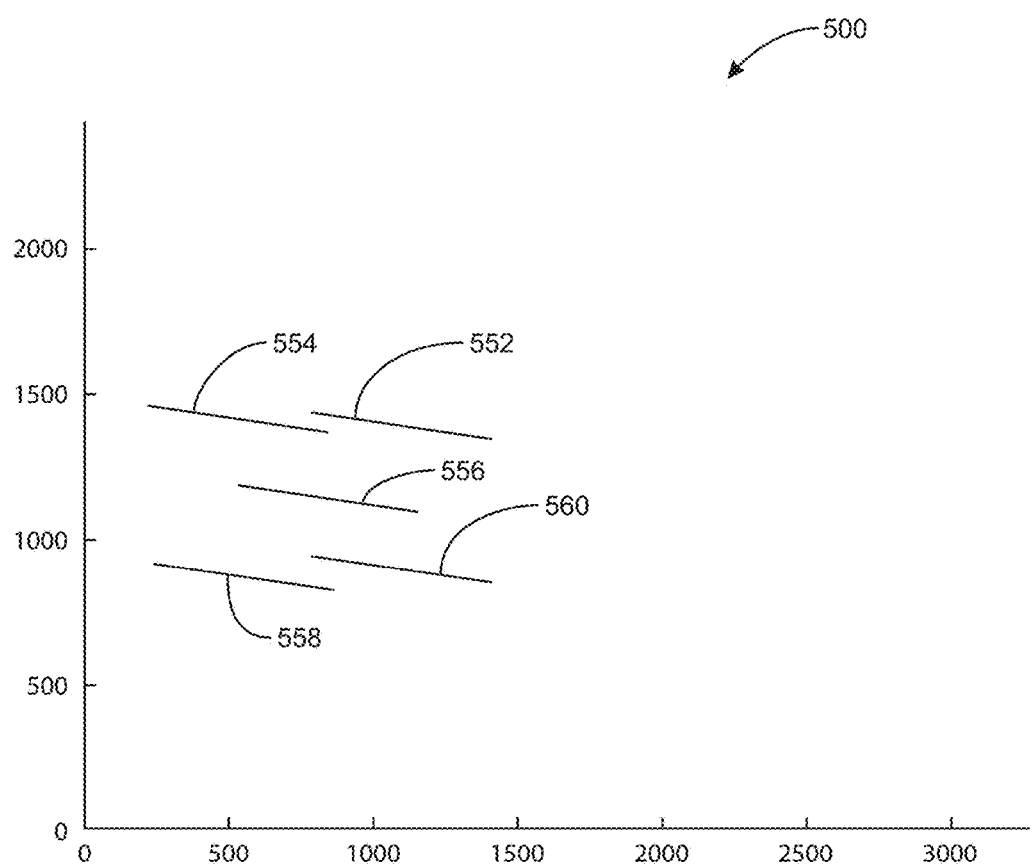
FIG. 14 illustrates the pixel mapping of the distortion ranges of the pattern illustrated in FIG. 13.

In a further embodiment of the embodiment illustrated in FIG. 12 and FIG. 13, filtering the image to locate the active illumination pattern or similarly for the fiducials in the reference template pattern (steps 406 in FIGS. 8 and 408 in FIG. 9) can be limited to a search for pixels proximate to the line segments 552, 554, 556, 558, and 560 illustrated in FIG. 14. This limited area of search, greatly speeds up pattern filtering step(s). In FIG. 14, the horizontal x axis represents the horizontal camera pixels, and the vertical y axis represents the vertical camera pixels and the line segments 552, 554, 556, 558 represent the coordinate along which the laser points (active illumination) may be found and thus the areas proximate to these line segments is where the search for laser points can be concentrated.

In the embodiment shown in FIG. 12, FIG. 13 and FIG. 14, the fixed projection axis of the active illuminator is slightly offset from the optical axis of the camera, which is useful in obtaining range information as described in Appendix A. Furthermore, the direction of the projection axis of the active illuminator relative to the camera axis has been chosen based on the particular pattern of active illumination such that, as the images of the active illumination dots shift on the camera sensor over the distance range of the non-orthographic image measurement system, the lines of pixels on the camera sensor over which they shift do not intersect. In this particular example, the line segments 512 and 514 and 518 and 520 do not intersect. This decreases the chance of ambiguity, i.e., of confusing one spot for another in the active illumination pattern. This may be particularly helpful where the active illuminator is a laser which is fitted with a DOE which are prone to produce "ghost images".

F. Operation of Preferred Embodiment

The user has an assembled or integrated Quantified Image Measurement System, consisting of all Cameras, Computer and Software elements, and sub-elements. The template pattern is a non-dynamic, fixed in geometry, and matches the pattern and geometry configuration used by the software to find reference points and to calculate non-orthographic distortion correction data and real world measurements.

The user aims the Quantified Image Measurement System in a pose that allows the Camera view and Reference Template to occupy the same physical space upon a selected predominantly planar surface, that is to be imaged. Computer and Software are then triggered by a software or hardware trigger, that sends instructions to Timing To Camera via Electrical And Command To Camera. The Camera may have a Filter System added or integral, which enables a more effective capture of the reference template, by reducing the background radiation, or limiting the radiation wavelengths that are captured by Camera for Software processing with reduced signal to noise ratios. The data capture procedure delivers information for processing into Raw Data. The Raw Data is processed, to generate Export Data and Display Data. The Export Data (QIF) and Display Data is a common file format image file displaying the image and any geometric measurements that have been generated, and with an embedded or attached correction data set whereby the distortion caused by non-orthographic camera angle or other distortion sources can be corrected to give accurate dimensions and 2D geometrical measurements. The Display Data also provides a user interface where the user can indicate key points or features in the image for which measurement data is to be generated by the QIF software.

The embodiments of a Quantified Image Measurement System described herein is structured to be used as either a passive or active measurement tool by combining known algorithms, reference points with scale and computer vision techniques. To create a new QIF, the user simply takes a photo within the quantified image measurement application, as they normally would with their portable device. The user then selects points or regions in an image from the QIF photo library on which to perform measurements by marking points within the photo using finger or stylus on a touch screen, mouse on a computer platform, or other methods, manual or automatic, to identify key locations within the photo. Software routines within the Quantified Image Measurement System calculate and display physical measurements for the points or regions so selected.

This invention is an improvement on what currently exists in the market as it has the ability to capture millions of measurement data points in a single digital picture. The accuracy associated with the measurement data is dependent on a) the reference points used, b) the pixel density (pixels/ angular field of view) in the digital camera in the host device and c) how they are processed with the algorithms within the QIF framework.

In addition the quantified image measurement system automatically corrects or compensates for any off-angle distortions introduced by the camera position and orientation relative to the scene.

The output QIF is (with or without marked up measurements) is saved in an industry standard image file format such as JPEG, TIFF, BMP, PDF, GIF, PNG, EXIF or other standard format than can be easily shared. The QIF extended data and dimensional characteristics are appended to the image using existing fields within these image formats such as the metadata field, or the extended data field, or the comments field. Applications and/or services that are "aware" of dimensional information, such as CAD applications, can use the QIF extended data and dimensional characteristics and the associated QIF processing routines for additional processing. Even other mobile devices equipped with the quantified image measurement application can read and utilize this QIF extended data and dimensional characteristics for additional processing.

There are a wide array of applications that can take advantage of the quantified image measurement system technology including but not limited to: Medical wound management measurement system, automatic item or box size recognition system, cable measurement system, design to fit system, object recognition system, object size and gender recognition and search system, biometric system, distance measurement system, industrial measurement system, virtual reality enhancement system, game system, Automatic quality control system used in home building, industrial buildings by using multiple and timescale pictures of the progress in this way you can create a digital home manuals that have all information in one database and more.

The Quantified Image Measurement System combines a number of known theories and techniques and integrates them into an all-in-one application (passive) and/or integrated app-enabled accessory (active) in an action that most everyone knows how to do: push a button to take picture.

The passive Quantified Image measurement System is based on a passive reference template introduced into the scene or a known reference object in the scene, a camera, and a data processor running software algorithms that learn scene parameters from the reference template/object and apply the scene parameters so-learned to calculate physical measurements from the image data. The QIF extended data and dimensional characteristics can be enhanced with specific applications and integrated service that can provide customer specific information within the same QIF extended data.

The active system is based on an active reference pattern projected onto the scene to be captured, with subsequent analysis based on optical triangulation and image analysis operations. The data processing includes learning scene parameters from the image of the projected light pattern and applying the scene parameters so-learned to calculate physical measurements from the image data. The QIF extended data and dimensional characteristics generated by the system can be enhanced with specific applications and integrated service that can provide customer specific information within the same QIF extended data.

A typical user case in consumer side for this invention would be that a person is home and wants to paint a wall but doesn't know how much paint is needed to complete the job. Using the quantified image measurement active system, a person can simply take any standard digital camera or device with camera, place a reference template or object onto the scene and photograph the scene. When the picture is opened in the quantified image measurement application, the surface to be painted is measured to calculate how much paint is needed. Based on the underlying image analysis combined with integrated paint usage models, the application can give exact information of how much paint is needed.

In the previous example, the basic measurement capture application can be enhanced with value-add applets that can solve specific customer problems. Examples: How much Paint? Does it fit? What is the volume? What is the distance? What is the height? What is the width? Give me a quote to paint the area? Where to find a replacement cabinet?

Additionally: A typical user case in industrial side for this invention would be that a contractor is visiting job site and wants to design a new kitchen cabinets but don't know how many pre-designed or custom cabinets could fit in the wall, by using this quantified image measurement system, the contractor can acquire multiple photographs of the scene at the job site and later open the picture in the quantified image measurement application to create QIF's with the specific measurements of interest. Subsequently he can share that information with the home office CAD system and come up with a solution of how many pre-designed or custom cabinets are needed and what would be the best way to install the cabinets, ultimately providing the information to provide an accurate quote for the job.

Similarly, the quantified image measurement system can be applied to: Medical wound management measurement system, automatic item or box size recognition system, cable measurement system, design to fit system, object recognition system, object size and gender recognition and search system, biometric system, distance measurement system, industrial measurement system, virtual reality enhancement system, game system, Automatic quality control system used in home building, industrial buildings by using multiple and timescale pictures of the progress in this way you can create a digital home manual that have all information in one database.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

The invention claimed is:

1. A system and apparatus for making accurate dimensional or geometrical measurements of features in a two-dimensional (2D) scene from a digital image of the 2D scene taken from a non-orthogonal perspective comprising:
   a. a digital scanner configured to capture the digital image of the 2D scene from the non-orthogonal perspective;
   b. a reference object comprising at least four co-planar reference fiducials located proximate to a surface of the 2D scene, wherein the surface of the 2D scene comprises the features to be measured, wherein the at least four co-planar reference fiducials further comprise a circle with an outer circumference, a center point, an area, and a plurality of lines that intersect the center point of the circle and divide the circle into pie piece wedges, at least one of the pie piece wedges comprising a gradient having a density which increases in an inward direction from the outer circumference of the circle toward the center point of the circle;
   c. a unique identifier (UID) located proximate to the surface of the 2D scene, wherein the UID is configured to provide the system and apparatus with information regarding a size or a type of the reference object;
   d. a data processing system configured to:
      i. receive the information regarding the size or the type of the reference object from the UID;
      ii. store information regarding a geometry of the reference object;
      iii. determine locations of the at least four co-planar reference fiducials within the digital image using the information regarding the geometry of the reference object by:
         1. recognizing and locating the reference object as a whole within the digital image of the 2D scene with a pattern recognition procedure;
         2. finding the circle of each of the at least four reference fiducials using Hough Circle detection;
         3. avoiding false recognition of a plurality of corners by locating a corner within the circle of each of the at least four reference fiducials using corner detection; and
         4. refining location of the center of the fiducial with sub-pixel precision using the gradient;
      iv. determine non-orthogonal distortions of the reference object;
      v. determine corrections for the non-orthogonal distortions of the reference object, wherein the corrections comprise correction data; and
      vi. apply the correction data to compute the accurate dimensional or geometrical measurements of the features in the 2D scene, wherein the dimensional or geometrical measurements of the features in the 2D scene comprise measurement data; and
   e. a user interface configured to display the accurate dimensional or geometrical measurements of the features in the 2D scene.

2. The system and apparatus of claim 1, wherein the dimensional or geometrical measurements of the features are automatically selected by the system and apparatus.

3. The system and apparatus of claim 1, wherein the user interface is further configured to allow the user to manually select features within the 2D scene to be measured.

4. The system and apparatus of claim 3, wherein the data processing system is further configured to create a digital image file comprising the digital image of the 2D scene and the correction data of the digital image.

5. The system and apparatus of claim 4, wherein the digital image file further comprises automatically generated measurement data or measurement data of parameters which were manually identified by the user.

6. The system and apparatus of claim 1, wherein the reference object comprises a printed pattern.

7. The system and apparatus of claim 6, wherein the printed pattern is on a sticker which can be affixed to the surface of the 2D scene to be measured.

8. The system and apparatus of claim 6, wherein the printed pattern comprises color.

9. The system and apparatus of claim 1, wherein the reference object comprises a pattern of electromagnetic emitting elements.

10. The system and apparatus of claim 9, wherein the electromagnetic emitting elements are configured to emit wavelengths that enable expedited determination of the locations of the at least four reference fiducials by the data processing system.

11. The system and apparatus of claim 1, wherein the digital scanner is comprises a camera.

12. The system and apparatus of claim 1, wherein the data processing system is further configured to create a digital image file comprising the digital image of the 2D scene and the correction data of the digital image.

13. The system and apparatus of claim 1, wherein the data processing system is local.

14. The system and apparatus of claim 1, wherein the data processing system is remote and data is transmitted via Cloud processing.

15. The system and apparatus of claim 1, wherein the UID comprises a barcode.

16. The system and apparatus of claim 1, wherein the UID is further configured to:
   a. provide the user with information about the digital scanner, wherein the information relates to pantone colors, a weight, a manufacturer, or a model number;
   b. provide the user with information about where the image measurement system can be downloaded to an electronic device;
   c. provide the user with marketing information comprising special promotions related to the features in the 2D scene; or d. serve as one of the at least four reference fiducials of the reference object; or any combination thereof.

* * * * *

UNITED STATES PATENT AND TRADEMARK OFFICE
CERTIFICATE OF CORRECTION

PATENT NO. : 10,083,522 B2  
APPLICATION NO. : 14/745325  
DATED : September 25, 2018  
INVENTOR(S) : Dejan Jovanovic et al.

Page 1 of 1

It is certified that error appears in the above-identified patent and that said Letters Patent is hereby corrected as shown below:

In the Claims

In Claim 3, Column 14, Line 43, please delete "wherein the user interface is further configured to allow the user to manually select features within the 2D scene to be measured" and replace with --wherein the user interface is further configured to allow a user to manually select features within the 2D scene to be measured--

In Claim 12, Column 15, Line 5, please delete "wherein the data processing system is further configured to create a digital image file comprising a digital image of the 2D scene and the correction data of the digital image" and replace with --wherein the data processing system is further configured to create a digital image file comprising the digital image of the 2D scene and the correction data of the digital image--

In Claim 16, Column 15, Line 22, please delete "provide the a user with information about the digital scanner" and replace with --provide a user with information about the digital scanner--

Signed and Sealed this  
Fifth Day of May, 2020

Andrei Iancu  
*Director of the United States Patent and Trademark Office*